No. 668,070. Patented Feb. 12, 1901.
C. E. VAN PATTEN & W. HILL.
TENSION DEVICE.
(Application filed May 19, 1900.)
(No Model.)
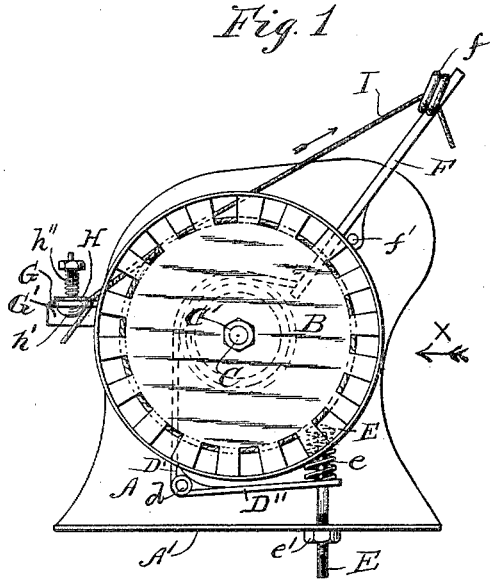
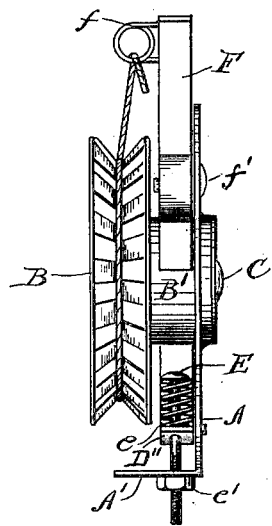
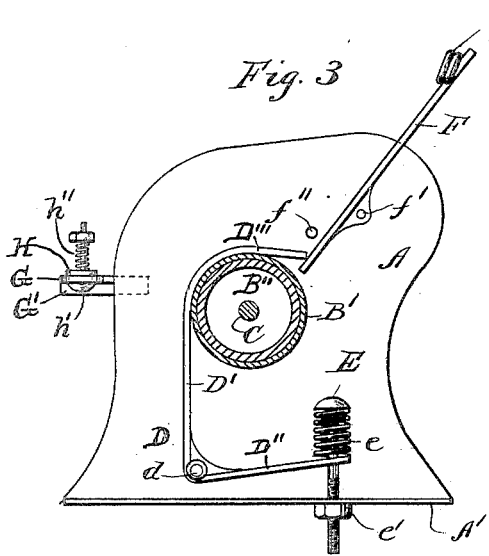
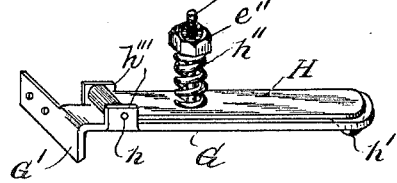
Witnesses:
G. S. Noble
Annie Phillips
Inventors
Charles E. Van Patten
William Hill
by Clarence Chamberlain
Att'y.

UNITED STATES PATENT OFFICE.

CHARLES E. VAN PATTEN AND WILLIAM HILL, OF HOLSTEIN, IOWA.

TENSION DEVICE.

SPECIFICATION forming part of Letters Patent No. 668,070, dated February 12, 1901.

Application filed May 19, 1900. Serial No. 17,223. (No model.)

*To all whom it may concern:*

Be it known that we, CHARLES E. VAN PATTEN and WILLIAM HILL, citizens of the United States of America, and residents of Holstein, in the county of Ida and State of Iowa, have invented certain new and useful Improvements in Tension Devices, of which the following is a specification.

Our invention relates to improvements in tension devices by which the movement of a cord or twine is controlled for delivery to the point of use. Its object is to produce a constant and uniform tension upon twine or cord passing therethrough. By our invention we are able to regulate the movement of the twine to provide for the passage of knots and other inequalities and to arrange for variations in the condition, size, or quality of the twine. Certain imperfections of the twine as it passes through the tension device operate, in the case of a rigid tension, unduly to increase the strain, usually causing it to break or to be fed under too great a strain. Again, when of small size the feed is too free to accomplish the best results. The action of our device is automatic, so that it accommodates itself to such conditions as those indicated and delivers the twine at all times at a tension which is constant and uniform. We attain these objects by the mechanism illustrated in the accompanying drawings, in which—

Figure 1 is a side view of a device constructed in accordance with the principles of our invention. Fig. 2 shows the same looked at in the direction of the arrow $x$ in Fig. 1. Fig. 3 is a side view of Fig. 1 with the tension-wheel removed and the hub and support therefor in section. Fig. 4 is an enlarged view of a mechanism by which the delivery of the twine to the main tension device may be regulated.

Further referring to the drawings, in which like letters and characters of reference denote like parts throughout, A is a plate or support on which are mounted the working portions of our device. A' is a flange or foot formed at right angles thereto, by which the same may be mounted in convenient position to receive the twine and deliver it to the point of use.

B is a grooved wheel, around which the twine is passed, having a hub B', journaled on the support B'', and is attached to the foundation-plate A by the bolt C and nut C'.

D is a brake in the form of a bell-crank lever, having a long arm D' and a short arm D''.

The hub B' is of sufficient length to allow the brake D to be mounted on the framing between the same and the tension-wheel B. The said brake is attached to the plate A by the pivot $d$. One end D''' of the long arm D' thereof is carried around the wheel-hub B', so as to bear snugly thereon, and is continued past the same for such a distance as may be practical or convenient. The other end is turned about the pivot $d$ and extended to form the arm D'', through which passes the bolt E. A spring $e$ is interposed between the head of said bolt and the arm D'' of said brake, and the tension thereof is regulated by the nut $e'$, which bears on the under side of the flange A', or other suitable means. A lever F, having a twine-eye $f$ on one arm, is pivoted at $f'$ to the plate A. The other end of the lever bears on the under side of the end D''' of the long arm D' of the brake D, and its motion to relieve the brake from its bearing on the hub B' is limited by the stop $f''$, secured to the plate A.

A twine-guiding mechanism, by which the twine may be delivered to the tension-wheel, is shown in Fig. 4. An arm G has a flange G', by which it may be attached to the plate A. A latch H is pivoted to the arm G at $h$ in ears or lugs $h'''$ and is provided with a pending projecting ball $h'$ or other suitable device, which closes into a corresponding opening in the arm G. A tension device having a bolt E', nut $e''$, and spring $h''$, similar to that controlling the brake mechanism, is provided to keep the parts H and G in relative position to each other and to produce such initial tension upon the twine as may be desired.

In the use of our device the twine I is carried from the ball or other source of supply through the opening in the arm G and the pressure of the latch thereon regulated as desired by the adjustment $h''$. The twine is then carried around the tension-wheel B and through the eye $f$ on the lever F and thence to the needle-eye of a twine-binder or other point of use. The main tension is adjusted by the pressure of the brake D upon the hub B' by means of the nut e'. The lever F will retain the position shown without lifting the brake from its bearing upon the hub. When, however, owing to the inequalities in the structure of the twine or other causes, the movement of the twine through the apparatus is checked, the increased strain on the twine causes the lever F to move, thus relieving the pressure of the brake upon the hub until the temporary strain on the twine is relaxed. The brake is relieved in exact proportion to the increased resistance, whereupon the lever F is released and the brake resumes the pressure at which it was set on the wheel-hub B', so that the twine runs through the apparatus, as before. It will be seen that by means of the mechanism shown a constant tension is kept upon the twine at the point at which it is to be used and variations of strain thereon are entirely prevented. Any changes in tension caused by any unusual or fortuitous circumstances are compensated for by a corresponding relief in the pressure of the brake mechanism upon the tension-wheel.

The principles of our invention may be carried out in many other ways than by the exact construction or mechanism shown. The device shown in the drawings is a practical and operative one, but may be varied in many ways without departing from the principles or spirit of our invention.

We do not limit ourselves to the construction shown or described, but claim, and desire to secure by Letters Patent, the following:

1. A tension device comprising a support, a grooved wheel, around which the twine is passed, having an extended hub journaled to the support, a brake in the form of a bell-crank lever pivoted to the support, having a long arm lapping the extended hub, a bolt extending through the short arm of the brake, a spring located around the bolt between the head of the latter and the short arm, and a nut mounted on the bolt so as to bear upon the support to adjust the tension of the spring.

2. A tension device comprising a support having a flange, a grooved wheel, around which the twine is passed, having an extended hub journaled to the support, a brake in the form of a bell-crank lever, pivoted to the support, having a long arm lapping the extended hub, a bolt extending through the short arm of the brake and through the flange of the support, a spring located around the bolt between the head of the latter and the short arm, and a nut mounted on the bolt beneath the flange for adjusting the tension of the spring.

3. A tension device, comprising a support, a grooved wheel, around which the twine is passed, having an extended hub journaled to the support, a brake in the form of a bell-crank lever, pivoted to the support, having a long arm lapping the extended hub, a spring device whereby the short arm of the brake is held yieldingly and a lever having an eye, through which the twine is passed from the wheel, pivoted in advance of the long arm of the brake and having its inner end resting against the end of the long arm.

4. A tension device comprising a support, a grooved wheel, around which the twine is passed, having an extended hub journaled to the support, a brake in the form of a bell-crank lever, pivoted to the support, having a long arm lapping the extended hub, a spring device whereby the short arm of the brake is held yieldingly, a lever having an eye through which the twine is passed from the wheel, pivoted in advance of the long arm of the brake and having its inner end resting against the end of the long arm, and a stop limiting the movement of the lever.

5. A tension device comprising a support, having a flange, a grooved wheel, around which the twine is passed, having an extended hub journaled to the support, a brake in the form of a bell-crank lever, pivoted to the support, having a long arm lapping the extended hub, a spring device whereby the short arm of the brake is held yieldingly, a lever having an eye, through which the twine is passed from the wheel, pivoted in advance of the long arm of the brake and having its inner end resting against the end of the long arm, and a twine-guiding device consisting of an arm having an opening and secured to the support, a latch pivoted to the arm and having a depending projection extending through the opening in the arm and a spring device whereby the latch is held yieldingly.

In witness whereof we have hereunto set our hands this 15th day of May, 1900.

CHAS. E. VAN PATTEN.
WILLIAM HILL.

Witnesses:
C. W. HOYER,
I. H. SHEARER.